R. ROWLEY.
Grape-Vine Trellis.
No. 85,244. Patented Dec. 22, 1868.
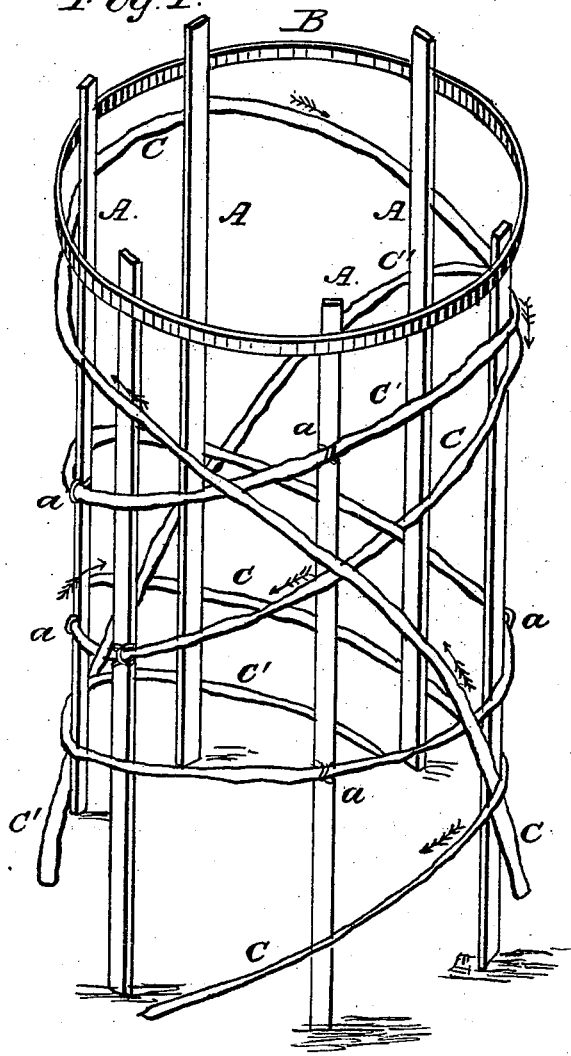
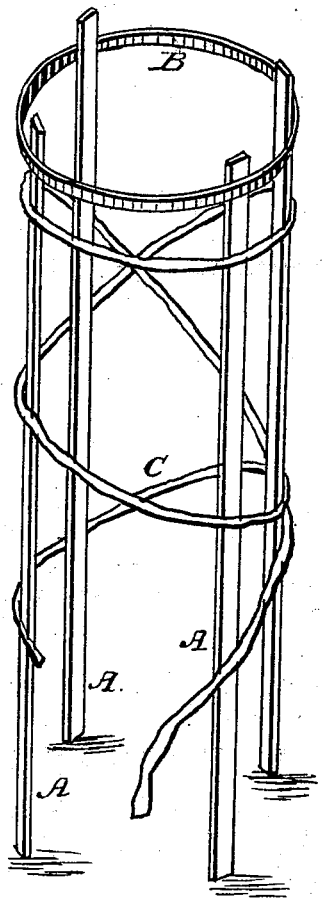
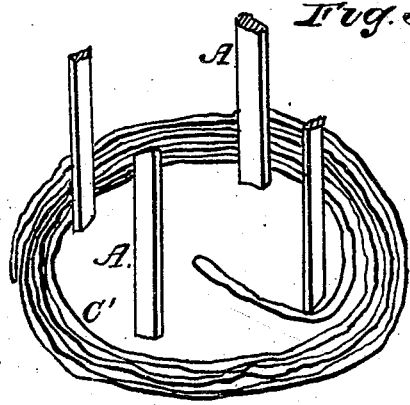

REUBEN ROWLEY, OF ROCHESTER, NEW YORK.

Letters Patent No. 85,244, dated December 22, 1868.

IMPROVEMENT IN TRAINING GRAPE-VINES.

The Schedule referred to in these Letters Patent and making part of the same.

*To all whom it may concern:*

Be it known that I, REUBEN ROWLEY, of Rochester, in the county of Monroe, and State of New York, have invented a certain new and useful Improvement in Training Grape-Vines; and I do hereby declare that the following is a full and exact description thereof, reference being had to the accompanying drawings, making part of this specification.

Figure 1 shows a trellis, with two vines training around it, in my improved manner.

Figure 2, a similar view, with one vine.

Figure 3, a view showing the vine lowered as in winter.

Like letters of reference indicate corresponding parts in all the figures.

One of the greatest difficulties in training grape-vines occurs from the tendency of the sap to rise so rapidly and concentrate in the top, that that portion of the vine receives the greatest stimulus, forming one mass of luxuriance, while the base is comparatively blank and desolate, producing no fruit. Each successive season removes the productive part of the vine further and further from the base, till finally the whole becomes worthless.

My invention consists in training the vine around a circular trellis, in a gradual spiral, till it reaches the top, and then training it back again in the same manner to the bottom of the trellis, thus bringing the top of the vine back upon the same level as the root. The effect is to check the too rapid flow and concentration of the sap, and thereby equalize it, so that the verdure is retained on the base-stalk as well as at the extreme end.

A secondary advantage is also gained in the employment of the circular trellis, by admitting a greater amount of light and air, in furnishing a greater trailing-surface in a limited compass, and in allowing the vines to be lowered in winter, by simply cutting the attaching-cords, and without disturbing the interlocking and clinging of the vines in the least.

In the drawings—

A A represent a suitable number of posts or standards set in or on the ground, in such a manner as to form a circular trellis, or one of approximate form, and connected at the top by a hoop, B, or by cross-pieces, or in any suitable manner, to hold them properly together.

The grape-vines C C, one, two, or more, are trained spirally up around the trellis, at a suitable angle, till they reach the top, and are then trained down again, in the same spiral manner, till they reach the bottom, as indicated by the arrows, fig. 1, bringing the top of the vine on a level with the base.

In vineyards the bases of the posts may be set in, so as to form an inverted cone, which will allow cultivating close up to the roots.

In this manner, and by this means, the too rapid flow and concentration of the sap is obviated, and that equalization obtained which is essential to preserve the verdure at the bottom as well as the summit of the vines, and the consequence is not only a greater amount of fruit, but also a better quality, for the reason of the equality of growth and the better distribution of the leaves, which thus produce less shade over the clusters of fruit.

In addition to the above, this circular trellis produces a maximum degree of trailing-surface in the minimum degree of space. It also admits a greater amount of light and air, so essential in the ripening of the fruit.

A more important feature, however, is the facility with which the vines may be lowered in winter, by simply loosing the attaching-cords $a\ a$. This allows the vines to fall in their natural position, and without disturbing the interlocking of the tendrils. In other arrangements the trellis itself is made to turn back, which strains the vines, but in none, so far as I am aware, has the vine itself been lowered independent of the trellis.

I am aware of the patent granted to J. Sollenberger, dated April 4, 1854, but as this invention forms no part of mine, I do not wish to claim it.

What I claim as my invention, and desire to secure by Letters Patent, is—

The spiral training of grape-vines around a circular trellis, first to the top and then back to the bottom, and entirely exposed to light and air, as herein set forth.

In witness whereof, I have hereunto signed my name, in the presence of two subscribing witnesses.

R. ROWLEY.

Witnesses:
J. A. DAVIS,
W. H. EVANS.